Jan. 12, 1960     E. W. BREMER     2,920,907
AUTOMATIC TRACTOR HITCH

Filed April 8, 1957     2 Sheets-Sheet 1

INVENTOR.

Edgar W. Bremer

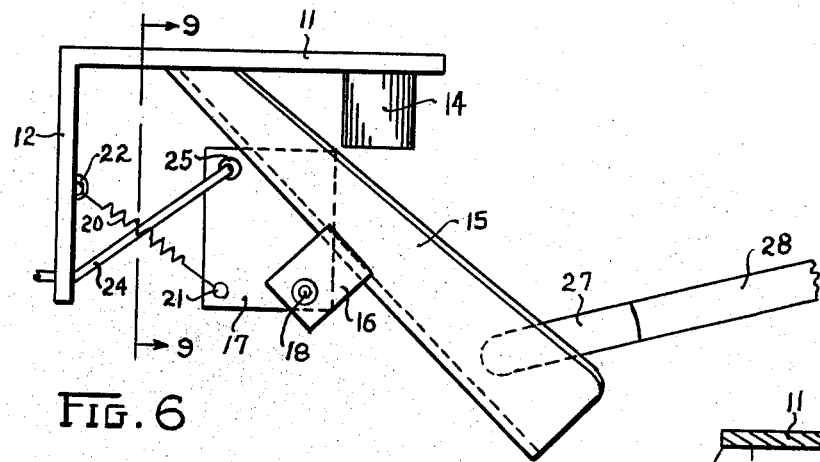
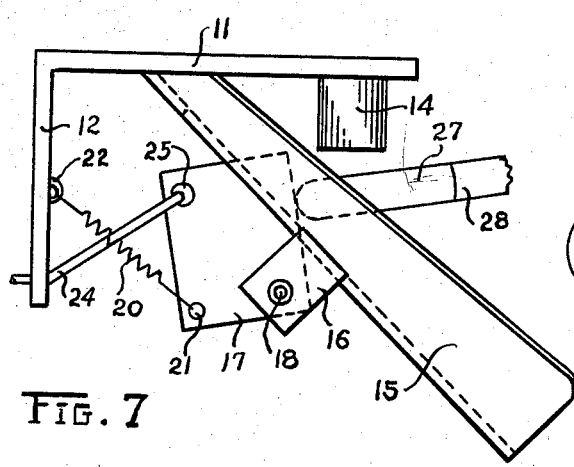
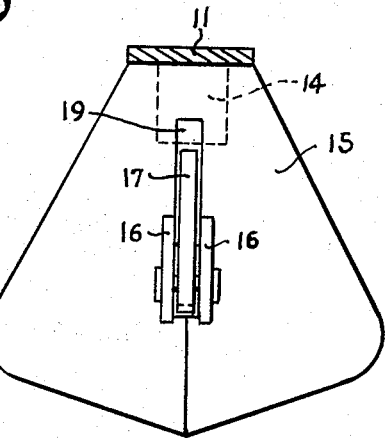
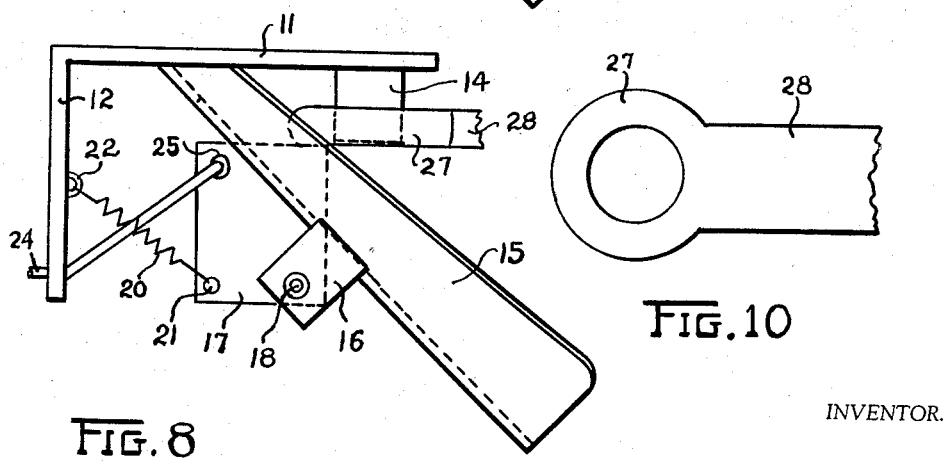

United States Patent Office 2,920,907
Patented Jan. 12, 1960

2,920,907
AUTOMATIC TRACTOR HITCH
Edgar W. Bremer, Okolona, Ohio

Application April 8, 1957, Serial No. 651,321

3 Claims. (Cl. 280—477)

The present invention relates to an automatic tractor hitch and more particularly to a tractor hitch that can be operated by the operator of the tractor while on the seat of the tractor.

In the use of a tractor with other machinery such as wagons, discs, pickers, spreaders, trailers and the like a considerable amount of time can be consumed in hitching and unhitching these trailing devices when an automatic hitch is not available. It is necessary to back the tractor to exactly the correct position for coupling to another machine. This maneuvering consumes valuable time. Many present tractor hitches require the operator of the tractor to dismount for each hitching and unhitching operation. This not only requires valuable time but also tires the operator. Some tractor hitches require a second person to hitch and unhitch a trailing device. It is appreciated that some forms of automatic tractor hitches have been devised but in my invention I shall disclose a novel type of automatic tractor hitch that has advantages not heretofore shown.

With my novel automatic tractor hitch the tractor is backed and the tongue of the trailer or implement is automatically guided to the proper position and then is automatically coupled to the tractor. To uncouple a trailer with my automatic tractor hitch the operator merely pulls a release cord and then drives the tractor ahead.

One of the objects of my novel invention is to provide a tractor hitch that can be operated by the operator of the tractor without dismounting.

Another object of my invention is to provide a tractor hitch incorporating a pick up guide of such construction as to cooperate with the tongue of a trailing device so that the tongue need not be held or arranged at a definite height and position when the tractor is backed into the equipment for coupling. The only requirement being a small stand to hold the tongue sufficiently high to come within the zone of action of the pick up guide.

Another object of my invention is to provide an automatically operated hitch having provisions for operating the hitch by the driver of the tractor whenever it is desired to uncouple the trailing device.

Another object of my invention is to provide an automatic trailer hitch that has a fixed or stationary hitch pin.

Another object of my invention is to provide an automatic trailer hitch that does not put a load on the automatic locking means or on any movable part of the hitch due to the tractor pulling the trailing device.

Another object of my novel invention is to provide an automatic tractor hitch that permits vertical and horizontal hinge action of the trailer tongue in the tractor hitch.

Another object of my invention is to provide an automatic tractor hitch that has a minimum number of moving parts.

Another object of my invention is to provide an automatic tractor hitch in which the locking means is not affected by the jostling or shaking of the implement tongue.

Another object of my invention is to provide an automatic tractor hitch that is strong, durable and inexpensive.

These and other objects will be apparent to those skilled in the art.

My invention consists in the construction, arrangements and combination of the various parts of the device, whereby the objects contemplated are attained as hereinafter more fully set forth, and specifically pointed out in the claims and illustrated in the accompanying drawings, in which:

Fig. 6 is a side elevation view of my automatic tractor hitch showing the implement tongue entering the pick up guide.

Fig. 7 is a view of my novel automatic tractor hitch showing the implement tongue engaging the locking member.

Fig. 8 is a view of my novel automatic tractor hitch showing the implement tongue locked in hitched position.

Fig. 9 is a part sectional view taken along line 9—9 of Fig. 6.

Fig. 10 is a view showing a portion of the hitching end of the implement tongue used with my novel automatic tractor hitch.

Figure 1:
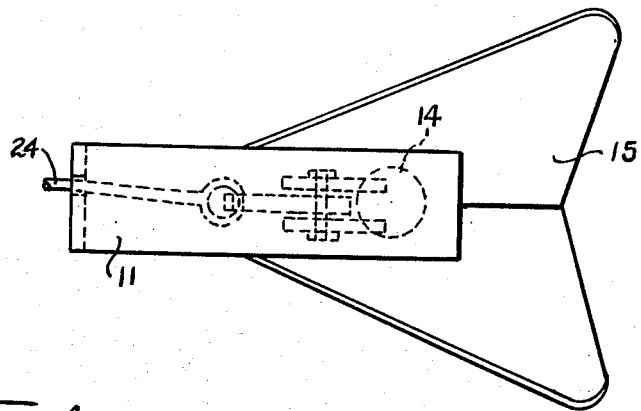
Fig. 1 is a top plan view of my automatic tractor hitch.
Figures 2, 5:
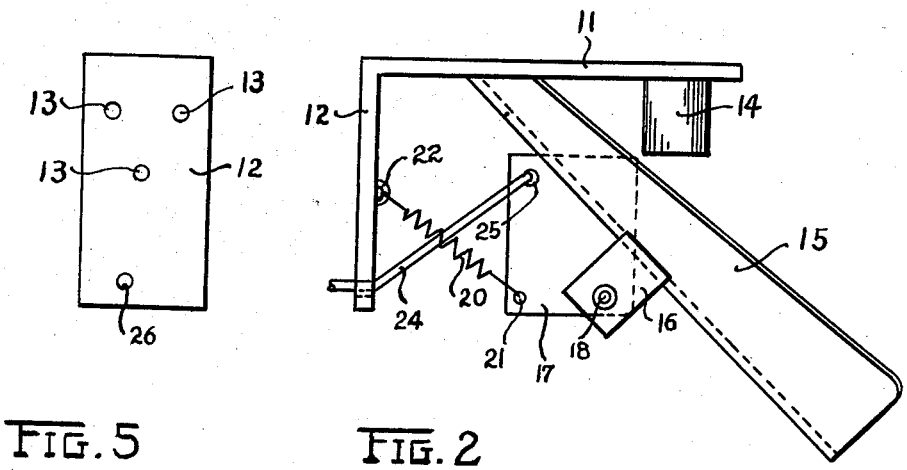
Fig. 2 is a side elevation of my novel automatic tractor hitch shown in Fig. 1.
Fig. 5 is a front elevation view of my automatic tractor hitch showing the tractor attaching portion.
Figure 3:
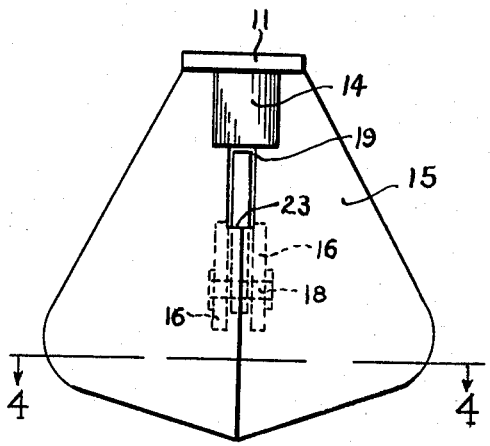
Fig. 3 is a rear elevation view of my novel automatic tractor hitch.
Figure 4:
Fig. 4 is a cross-sectional view taken along line 4—4 of Fig. 3.

Referring more particularly to the drawings, 11 designates the frame member of my novel automatic tractor hitch. The forward end of the frame member 11 is provided with a downwardly extending attaching bracket 12 adapted to be secured to a tractor. The holes 13 in the attaching bracket 12 are adapted to receive bolts for securing the unit to a tractor. A hitch pin 14 is welded or otherwise secured to the under side of the frame member 11. A pick up guide 15 is secured to the under side of the frame member 11 intermediate its ends and extends rearwardly and downwardly therefrom. A pair of hinge pin brackets or lugs 16 are secured in spaced relationship to the under side of the pick up guide 15. A locking member 17 is pivotably mounted on a pivot pin 18 secured in the hinge pin brackets 16. The locking member 17 extends through a slot 19 in the guide 15 so that the top surface of the locking member 17 is substantially at the same level or height as the lower end of the hitch pin 14. One end of the tension spring 20 is secured to an aperture 21 in the locking member 17 and the other end of the tension spring 20 is secured to the fastening means 22 on the attaching bracket 12. The lower edge 23 of the slot 19 provides a stop to retain the locking member 17 in the correct position. A trip or release rope 24 is secured in the aperture 25 of the locking member 17, passes through the aperture 26 of the attaching bracket 12 and extends to the proximity of the tractor seat (not shown).

An eye member 27 is provided on the hitching end of the implement tongue 28 as shown in Fig. 10. The eye member 27 is adapted to engage the hitch pin 14 when the trailing implement is hitched to the tractor.

In use, the agricultural or other device to be drawn by the tractor is arranged so its tongue 28 will reach the elevation of the pick up guide 15. Thereupon the operator backs the tractor so that the implement tongue 28 enters the pick up guide 15 as shown in Fig. 6. As the tractor continues to back the pick up scoop 15 guides the implement tongue so that it engages the locking member 17 as shown in Fig. 7. As the operator continues to back the tractor the eye member 27 of the implement tongue 28 continues to travel upward in the pick up guide pushing the locking member 17 forward causing it to pivot on the pivot pin 18, in a counterclockwise direction as shown in Fig. 7. As the tractor is backed further the eye member 27 travels further up the pick up guide 15 and the hitch pin 14 enters the eye member 27. As soon as the eye member 27 travels higher than the locking member 17 the tension spring 20 causes the locking member to return to the normal or locked position. Fig. 8 shows the locking member 17 in the normal or locked position after the hitch pin 14 is located in the eye member 27. The implement is then securely hitched to the tractor.

It will be noted that any strain produced by the tractor pulling the implement is transmitted from the eye member 27 to the hitch pin 14. The locking member 17 merely supports the front end of the implement tongue 28. Any weight or pressure from the implement tongue that is exerted downwardly on the locking member 17 is applied substantially directly above the pivot pin 18, hence, little or no force is exerted on the locking member to turn it. The tension spring 20 retains the locking member 17 in the normal or locked position. Any whipping action of the implement tongue 28 takes place between the hitch pin 14 and the eye member 27, hence, the moving part of my novel automatic tractor hitch is not affected by the whipping action of the implement tongue. This eliminates undue wear on the moving part.

When the implement is to be disengaged or unhitched the operator pulls on the trip rope 24, thereby, moving the upper portion of the locking member 17 forward and permitting the eye member 27 to drop down onto the pick up guide 15. The tractor is then moved forward permitting the eye member 27 to disengage the hitch pin 14 and slide down the pick up guide 15. The unhitching operation is then complete and the automatic tractor hitch is ready for the next hitching or coupling operation.

The shape and size of the attaching bracket 12 may be varied so as to adapt my novel automatic tractor hitch to various makes of tractors. In some installations an additional bracket and brace member are necessary to secure my novel tractor hitch to the tractor.

From the above description it is apparent that the operator of the tractor can hitch and unhitch implements and trailers without dismounting. The hitching and unhitching operations can be quickly and easily accomplished with a minimum effort on the part of the operator.

While I have illustrated and described one form of invention it is apparent that many modifications and changes therein can be made in the construction and arrangement of the various parts by those skilled in the art without departing from the spirit of my invention. For example a roller may be used for guiding the trip rope 24 through the attaching bracket 12. The pick up guide may be secured to the frame member 11 or the attaching bracket 12 by means of braces. The hitch pin 14 may be secured to the frame member 12 by means of a bolt. Other resilient means may be used in place of the tension spring 20 to retain the locking member in closed position. Therefore, I do not wish to be limited to the particular form shown and described and I reserve the right to all such modifications and changes as may come within the scope of the following claims.

What I claim is:

1. An automatic tractor hitch of the type described comprising, a frame member designed to be attached at one end to a tractor or the like, a straight hitch pin extending downward from said frame member near the other end thereof, a pick up guide secured to said frame member intermediate said hitch pin and the attaching end of said frame member, a locking member pivotably mounted upon said pick up guide and extending through a slot in said pick up guide, said locking member engaging the surface of said pick up guide defining one end of said slot while in the closed position, a resilient means adapted to yieldably retain said locking member in closed position and a ropelike member secured to said locking means extending through an aperture in said frame member to the proximity of the seat of said tractor.

2. An automatic tractor hitch of the type described comprising, a frame member, said frame member provided with a tractor attaching member at the forewarad end thereof, a vertical hitch pin extending downwardly from said frame member near the rearward end thereof, a pick up guide extending downwardly and rearwardly from said frame member from a point intermediate said hitch pin and said attaching member whereby said pick up guide is adapted to guide the hitching eye member of a trailing device into hitching engagement with said hitch pin, a locking member pivotably secured below said pick up guide and extending through an elongated slot in said pick up guide, the wall defining one end of said slot adapted to limit the turning in one direction of said locking member, said locking member adapted to retain said hitching eye member in engagement with said hitch pin while in closed position, a resilient means yieldably retaining said locking member in said closed position and a flexible member adapted to extend from said locking member to the seat of said tractor whereby said locking member may be opened.

3. An automatic tractor hitch of the type described comprising, a frame member, a tractor attaching member located at one end of said frame member, a straight hitch pin extending downwardly from the under side of said frame member near the other end thereof, a pick up guide extending downwardly and rearwardly from said frame member rearwardly of said tractor attaching member, a hitching passageway located between said hitch pin and said pick up guide, an elongated slot located in said pick up guide, a pair of lugs secured to the under side of said pick up guide, a locking member pivotably secured to said pair of lugs, said locking member extending upwardly through said elongated slot in engagement with the wall defining one end of said slot and substantially closing said hitching passageway when in closed position, a resilient member yieldably retaining said locking member in said closed position and a flexible releasing member engaging said locking member and extending through an aperture in said tractor attaching member to the proximity of the seat of a tractor whereby said locking member may be opened.

References Cited in the file of this patent

UNITED STATES PATENTS

| | | |
|---|---|---|
| 731,707 | Putnam | June 23, 1903 |
| 1,378,619 | Robertson | May 17, 1921 |
| 2,772,896 | Kemper | Dec. 4, 1956 |
| 2,834,277 | Tanke | May 13, 1958 |